United States Patent [19] [11] Patent Number: 5,060,171
Steir et al. [45] Date of Patent: Oct. 22, 1991

[54] A SYSTEM AND METHOD FOR SUPERIMPOSING IMAGES

[75] Inventors: Stephen C. Steir, Millbury, Mass.; Allen K. A. Wells, Millford, both of Mass.

[73] Assignee: Clearpoint Research Corporation, Hopkinton, Mass.

[21] Appl. No.: 386,581

[22] Filed: Jul. 27, 1989

[51] Int. Cl.⁵ .............................................. G06F 15/20
[52] U.S. Cl. ..................................................... 364/521
[58] Field of Search ........................ 364/518, 521, 522; 358/93, 903; 340/723, 724

[56] References Cited

U.S. PATENT DOCUMENTS

| 4,232,334 | 11/1980 | Dyson | 358/93 |
|---|---|---|---|
| 4,261,012 | 4/1981 | Maloomian | 358/93 |
| 4,276,570 | 6/1981 | Burson et al. | 358/903 |
| 4,297,724 | 10/1981 | Masuda et al. | 358/93 |
| 4,486,774 | 12/1984 | Maloomian | 358/93 |
| 4,539,585 | 3/1985 | Spackova et al. | 358/93 |
| 4,602,280 | 7/1986 | Maloomian | 358/93 |
| 4,730,260 | 3/1988 | Mori et al. | 364/518 |
| 4,731,743 | 3/1988 | Blancato | 364/521 |

FOREIGN PATENT DOCUMENTS

| 5121426 | 9/1980 | Japan . |
|---|---|---|
| 5133184 | 10/1980 | Japan . |
| 5150673 | 11/1980 | Japan . |
| 5150675 | 11/1980 | Japan . |
| 5150676 | 11/1980 | Japan . |
| 55-11162 | 5/1981 | Japan . |

OTHER PUBLICATIONS

Bradley et al. "Special Effects Employing Digital Pattern Generation," pp. 14–20, 1974.

Primary Examiner—Heather R. Herndon
Attorney, Agent, or Firm—Edward W. Porter

[57] ABSTRACT

An image enhancement system and method includes means for superimposing a second image, such as a hair style image, over portions of a first image, such as an image of a person's face. The system or method further automatically marks locations along the boundary between the first and second images and automatically calls a graphic smoothing function in the vaccination of the marked locations, so the boundary between the images is automatically smoothed. Preferably, the smoothing function calculates a new color value for a given pixel in the vicinity of such a marked location in at least two smoothing steps, the first of which calculates the color value for each of a plurality of pixels adjacent to the given pixel by combining color values from pixels which are separated, respectively, from each of those plurality of pixels by a distance of more than one pixel. The second step calculates the new color value for the given pixel by combining the color value of each of the plurality of pixels. When used to superimpose hair styles, the system includes means for defining locations on the hair style image, means for defining locations on the head image, means for superimposing the hair style image on the head image so that the defined locations on the hair style image fit those on the head image; and means for altering the size of the hair style in horizontal and vertical directions without altering the fit of the defined locations on the hair style image to the defined locations on the head image. Preferably, in frontal images, both ears and the center of the hair line are used as the defined locations. In a side view, one ear and the center of the hair line are used as the defined locations.

20 Claims, 16 Drawing Sheets

A SYSTEM AND METHOD FOR SUPERIMPOSING IMAGES

FIELD OF THE INVENTION

The present invention relates to image enhancement systems, which enable a user of such systems to take pictures of objects and then enhance or alter those pictures to better envision what the object would look like if certain changes were made to it. The invention has specific features which are of particular use in facial image enhancement systems which lets a user take an image of a person's face and then modify the image of their hair and make-up.

BACKGROUND OF THE INVENTION

The basic concept of image enhancement systems is very old. People have often used visual aids to help them better image how they or some object would look if a certain change were made to their appearance. Before the advent of video cameras and graphic computer systems people used to hold a piece of clothing in front of them as they stood in a mirror to better imagine what they would look like with the piece of clothing on. Others might cut and paste a picture of a certain type of hair style over a photograph of their face to better imagine what a change in hair style would look like before taking the sometimes emotionally frightening step of drastically changing their hair style.

With the advent of video machines and graphic computers image enhancement has become much easier and much more realistic. In recent years image enhancement systems have been developed that enable one to make an image of a scene with a video camera, and then use computer graphics to superimpose images on top of part of the scene, to change the color of all a portion of the original or the superimposed images, or to draw desired changes on any portion of the original or superimposed image.

Such image enhancement has been used for many purposes: including letting architects, landscapers, and interior decorators better imagine and convey to their customers how changes to a house, yard, or office would look; including letting stores indicate how various clothes or glasses would look on customers without the need to try them all on; and including letting beauty saloons, hair stylists, and cosmetic sales people demonstrate to clients how they would look with different hair styles, hair length, hair color and make-up.

This last use of image enhancement, that of letting people see how they would look with different hair styles and make-up, has generated considerable commercial interest. As a result, several facial image enhancement systems have been developed in the prior art. Although these prior art systems represent a considerable improvement over cutting and pasting paper images of hair styles over images of a customer's face or of letting the customer merely experiment with various make-up schemes, they are not as easy to use as many potential customers for facial image enhancement systems desire.

SUMMARY OF THE INVENTION

An object of the invention is to provide an image enhancement system that is easier to use than image enhancement systems in the prior art.

Another object of the invention is to provide a facial image enhancement system that is easier to use than such systems in the prior art.

A further object of the invention is to provide an image enhancement system that makes it easier to overlay an image on top of another image without making the superimposed image look unnatural.

Yet another object of the invention is to provide a facial image enhancement system that makes it easier to properly scale and place the superimposed image of a hair style on top of a face.

Still another object of the invention is to provide a facial image enhancement system that makes it easier for users to select which hair style they wish to superimpose on an image of a face.

The present inventions relates to an image enhancement system which allows an image to be automatically placed, scaled, and smoothed by matching anchors on the image to be superimposed to those on the image over which they are to be placed, by automatically computing the boundary of the superimposed image and by calling a smoothing function to automatically smooth that boundary. The invention also lets a superimposed image be unevenly expanded and contracted so that the superimposed image will still fit the anchors on the image over which it is to be placed. The preferred embodiment of the invention is a facial image enhancement system which lets users see themselves with changed hair styles, hair color, and make-up. The preferred embodiment is designed to be used without a keyboard to make it easier to use, and it comes in a kiosk which provides convenient works surfaces, good light, and a natural vertical alignment of the video camera and video monitor used.

DESCRIPTION OF THE DRAWINGS

These and other aspects of the present invention will become more evident upon reading the following description of the preferred embodiments in conjunction with the accompanying drawings, in which.

DETAILED DESCRIPTION OF PREFERRED EMBODIMENTS

A. Description of System Components

Figure 1:
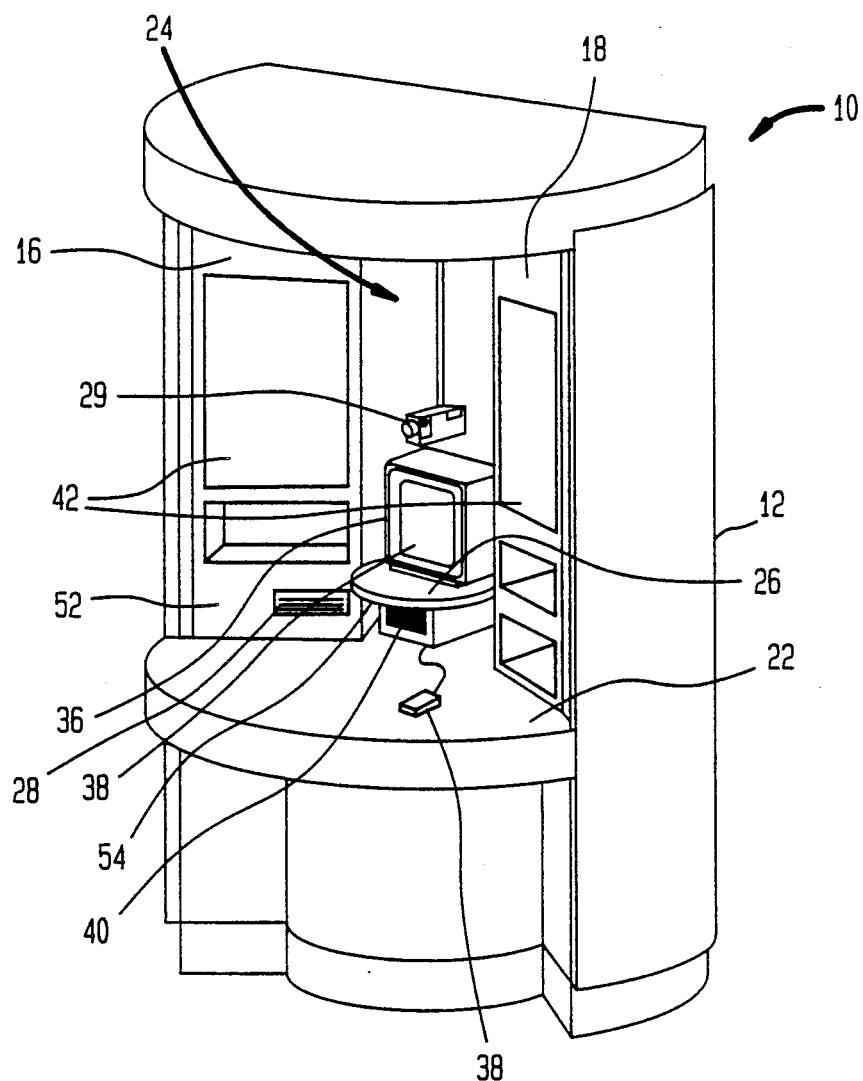
FIG. 1 is a front perspective view of the facial image enhancement system of the preferred embodiment of the present invention.
Figure 2:
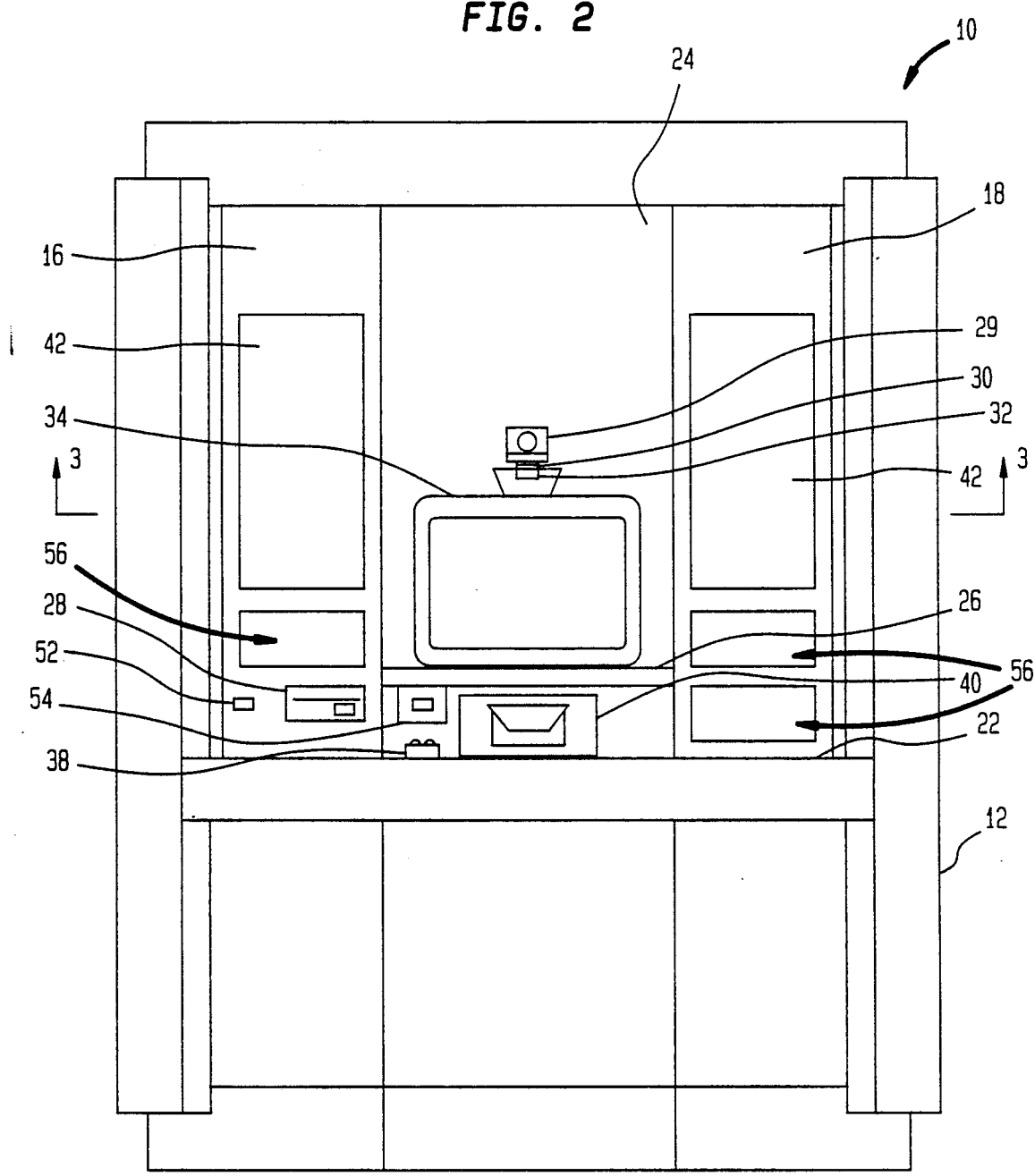
FIG. 2 is a front plan view of the image enhancement system shown in FIG. 1.
Figure 3:
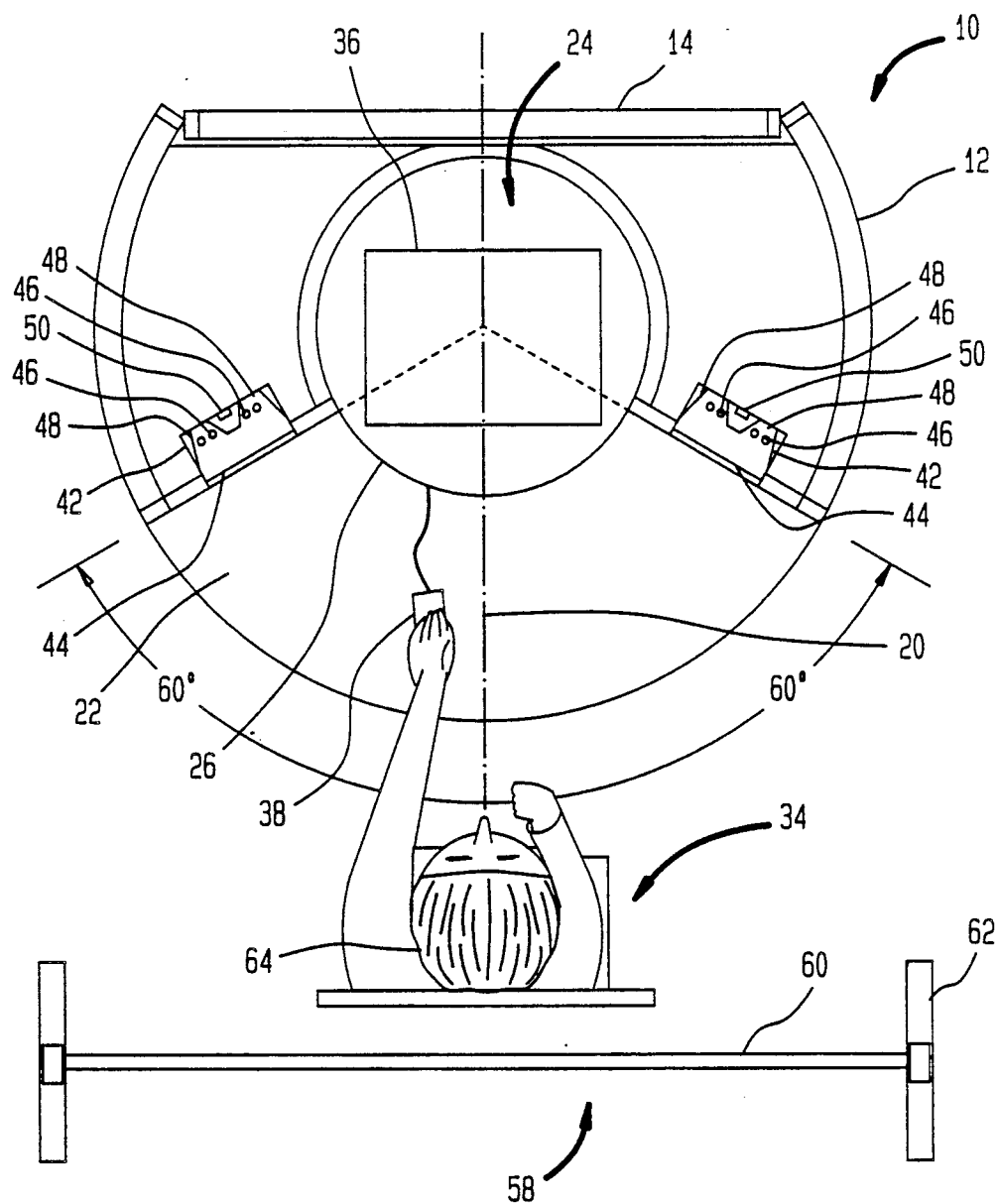
FIG. 3 is a top cross-sectional view of the image enhancement system shown in FIGS. 1 and 2 taken along the line 3—3 shown in FIG. 2, showing a person using the system.

FIGS. 1–3 are views of the facial image enhancement system 10 of a preferred embodiment of the invention. FIG. 1 is a perspective view, taken from the right front side of the system. FIG. 2 is a front plan view. And FIG. 3 is a cross sectional view taken from the top along the lines 3—3 shown in FIG. 2.

The image enhancement system 10 includes a kiosk 12 which holds the other components of the system. As can be seen from FIGS. 1 and 3, this kiosk is in the shape of a cylinder having a vertical axis. As is shown in FIG. 3, the back 14 of this cylinder is flattened so as to reduce the amount of space the kiosk takes up when it is placed against a wall, and to allow two such kiosks to be placed compactly in a back-to-back relationship. The front of the kiosk's cylinder has a one hundred and twenty degree wedge cut out from it. This wedge creates two flat vertical surfaces, a left flat vertical surface 16 and a right flat vertical surface 18.

The kiosk includes a roughly semi-circular work surface 22 which is concentric with the vertical axis of the kiosk's cylinder and has approximately the same radius as the kiosk's outer cylinder. This work surface 22 is at desk level, so that it can be use as a desk surface. Above the work surface is a cylindrically shaped cavity 24, which is concentric with the outer cylindrical surface of the kiosk. As can best be seen from FIG. 3, this cavity is open in the one hundred and twenty degree angle between the flat vertical surfaces 16 and 18. This cavity provides space for various components of the image enhancement system. Located within this cavity is a monitor shelf 26. This shelf is located high enough to support a video monitor at about head level to one sitting in front of the kiosk.

The components which are located within the kiosk 12 includes the following:

A personal computer is placed inside the kiosk 12. It is located below the level of the work surface 22 in which there is no central cavity 24. Since it is inside the kiosk it is not shown in the drawing. For purposes of the claimed invention almost any brand of computer which has the power to perform the graphic operations it requires could be used. In the preferred embodiment, the computer used is an Amiga 2000 personal computer manufactured by Comadore Business Machines, Inc. The Amiga has built into its hardware and operating system the ability to support 320×400 pixel graphics, with each pixel representing one of a selectable set of sixteen different colors. The Amiga is supplied with one internal floppy disk for storing the software needed to make it function as a facial image enhancement system.

It also has one external floppy disk drive 28, shown in FIGS. 1 and 2, which is located in the flat vertical surface 16. This external drive enables users to perform functions such as entering hair styles to be superimposed on facial images, formatting disks, and changing the system's image enhancement software. In the preferred embodiment, the Amiga is supplied with approximately five megabytes of random access memory so that it can store all the software it needs to function, and so that it can keep several high resolution graphic images in its memory at one time.

The Amiga also includes a high resolution graphics board. This board is capable of taking a moving video signal from a video camera and converting a frame of it into a single 512 by 480 pixel image. Each pixel of such an image is represented by twenty-four bits, eight of which are used to represent the intensity of each of the three basic colors—red, green, and blue—associated with that pixel. The video board can be write to, or read from, the Amiga's random access memory the 512×480 resolution still video images it forms. It can feed out to an RGB monitor either the 320×400 graphic images produced by the Amiga's graphics, a 512×480 high resolution graphic image produced by the video board itself, a moving image from a video camera, or a combination of both Amiga graphics and either moving video or a video still.

A video camera 29 is mounted inside the central cavity 24. In the preferred embodiment this camera is a JVC CCD color camera. This camera is mounted on an adjustable swivel mount 30 which is located at the end of a boom 32 which is mounted on the back of the cavity 24. As a result, the camera will be almost directly in front of a user 34, shown in FIG. 3, facing the center of the kiosk. The video output of this camera is connected to the video input of the video board on the system's personal computer. This camera is used to take the facial pictures which the system is to enhance.

An RGB high resolution color monitor 36 is located on top of the monitor shelf 26, with its center directly below the video camera 28. This monitor is placed roughly at head level for users, such as the user 34 sitting in front of the kiosk. This RGB monitor receives the video output of the system's video board. It is capable of displaying the 512×480 pixel and 320×400 pixel outputs of the system's video board on its screen 38. It is used to show a picture of the facial images captured by the video camera. In addition, hair styles, colors and color analysis information stored on the floppy disks can be retrieved by the system and displayed on the color monitor.

A mouse 38 is connected by a cord to an input on the Amiga computer. A hole is placed in the back surface of the cavity 24 beneath the shelf 26, so that the mouse can be easily used on the horizontal work surface 22. The mouse is a pointing device which gives the user control of all the system functions by rolling the mouse on the work surface 22 and by pressing a button located on the top of the mouse. Moving the mouse causes a cursor on the screen 38 to move in a corresponding manner. By moving the cursor to icons, that is, to symbolic little pictures located on the screen 38, and clicking, the user can select functions associated with those icons. In certain modes the cursor can also be used to perform functions such as cutting, selecting colors, and drawing. One of the major advantages of the image enhancement system 10 is that is lets its operators perform all the functions they need for image enhancement by using the mouse, icons and cursors. As a result, the system is easy to learn and use, and it can be used totally without a keyboard, a feature which is very attractive to many operators in the beauty professions.

A Polaroid film recorder 40 is located on the work surface 22, in the central cavity 24, below the monitor shelf 26. The film recorder produces a photographic quality print of the image on the color monitor.

A lamp 42 is located in each of the flat vertical surfaces 16 and 18 of the kiosk. Each lamp includes a box like enclosure having a relatively large plexiglas diffusion plate 44 in the front, two separate 39 watts, General Electric biaxial fluorescent light bulbs 46, model F39BX/SPX30, extending vertically inside, and a reflector surface 48 behind each of these bulbs, so as to reflect the bulb's light out through the diffusion plate in a relatively even manner. The light bulbs have a vertically extended "U" shape, and have a color spectrum that is warm and that is flattering to most people. Each of the lamps also has a ballast 50 located between the reflective surfaces 48. The combination of the "U" shaped bulb, the reflectors and the diffusion plate all combine to make the relatively large front surface of each of the lamps 42 to appear of almost even luminosity. This lets the lamps emit a relatively large amount of light so as to assure good video imaging, without having the amount of light being generated from any one point be so bright as to be uncomfortable to look at.

A light switch 52 is located in the flat vertical surface 16 above the work surface 22 and below the lamp 42. The switch turns on and off the lamps 42. These lamps are switched on before taking a client's picture, and can be switched off when the picture has been recorded on the monitor.

A power switch 54 is located on the left-hand side of the cabinet, underneath the monitor shelf 26. This power switch is used to turn on and off the image enhancement system. It is the only switch the operator has to use to bring up the image enhancement system. The Amiga has been programmed to automatically load up and start running the image enhancement software located on its internal floppy disk drive when this switch is turned on. The user can exit the image enhancement software merely by turning the system off. The system has been designed so that the user has no means to make the system exit the image enhancement program, unless the system were for some reason to crash.

Three separate openings 56 are provided in the flat vertical surfaces of the kiosk. They can be used to store objects like floppy disks and pencils.

The image enhancement system is also provided with a background panel 58 and a hair tube, or sock, 64, as are both shown in FIG. 3. The background panel 58 includes an aqua matte board 60 in a floor stand 62, which can be placed behind a person 34 being photographed, so as to provide a uniform background for his or her picture. The hair tube is a piece of material which can be worn over the head of someone whose picture is being taken, somewhat like a nylon stocking. It pulls the person's hair back and makes it lie close to his or her head. This is necessary if the user currently has a hair style which sticks out more from the head than the hair styles to be superimposed.

B. Automatic Scaling and Placement of Hair Image

Referring now to FIGS. 4-10, a description will be made of the preferred embodiment's method for automatically scaling and placing a hair style image over a face image.

Figure 4:
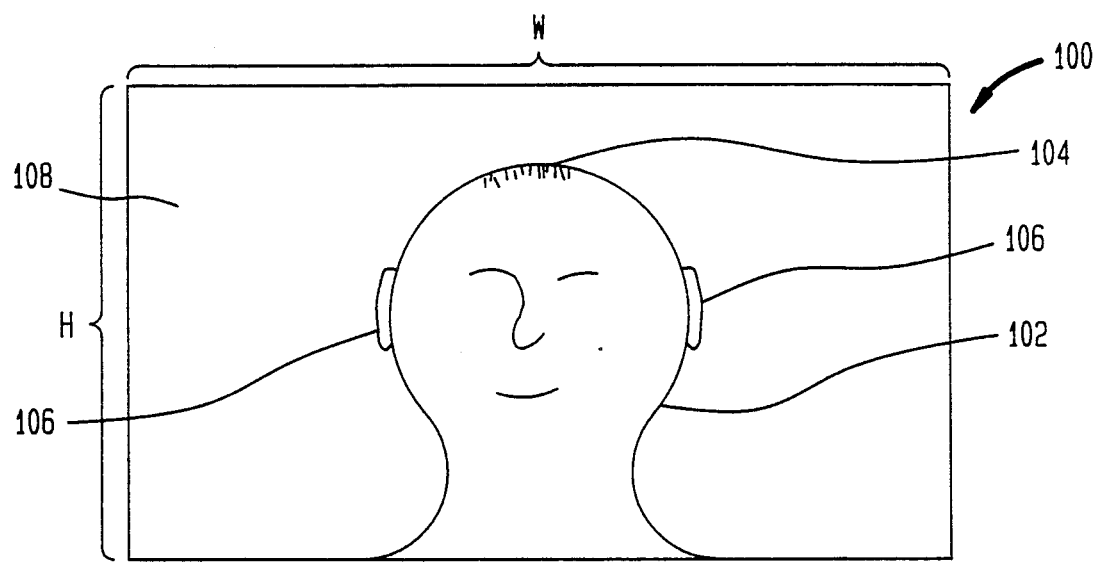
FIGS. 4–10 are schematic representations of facial and hair style images used to demonstrate the process by which a hair style image is automatically scaled and placed on top of the facial image to form a superimposed image.

FIG. 4 provides a schematic representation of an image 100 of a woman's face 102 taken with the camera 29 and the system's video board. The image assumes the women's hair 104 has been largely pulled out of sight by a hair tube 64 of the type shown in FIG. 3. It also assumes the picture has been taken against a solid background 108, such as the one provided by the background panel 58 shown in FIG. 3. Once such a picture is taken it is automatically shown on the screen 38 of the color monitor 36. The image 100 is taken in the video board's 512×480 resolution, but it contains 512 in the horizontal direction indicated by W for "width" and 400 pixels in the vertical direction indicated by H for "height". It only has this many pixels since, as is shown the image is only intended to fill central portion of the monitor screen 38.

Figure 5:
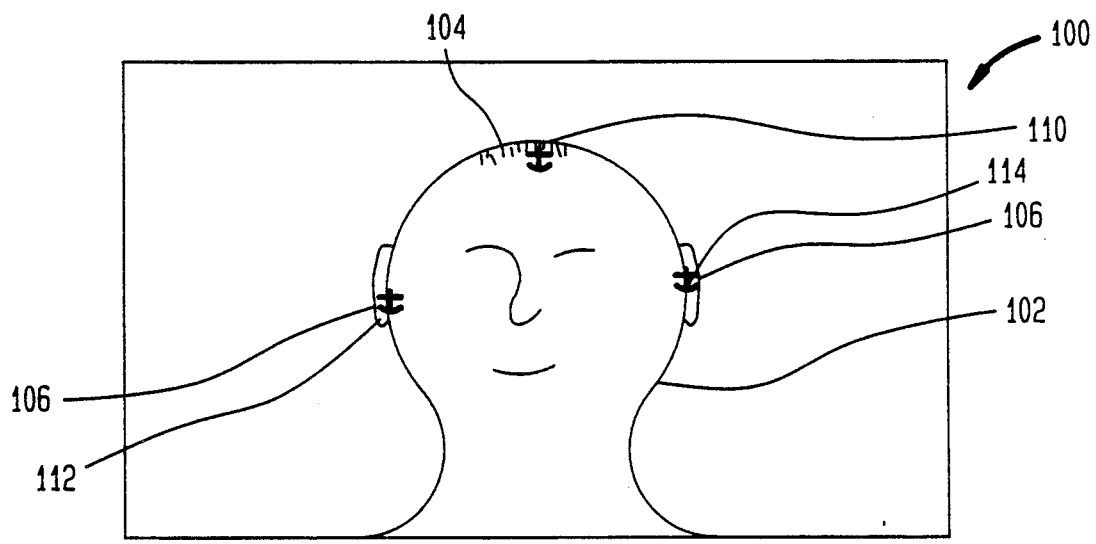

FIG. 5 shows that once the woman's image 100 has been taken and is exposed on the monitor screen 38, the operator of the system, which can be either the woman pictured or another person, such as a beauty consultant, uses the mouse to place anchors on the image to indicate the center of her hair line 110, and the center of her ears, 112 and 114, respectively, on the left and right side of the image. As can be seen from the drawings the anchors located at each of these three locations are indicated symbolically by anchor shaped icons.

Figure 6:
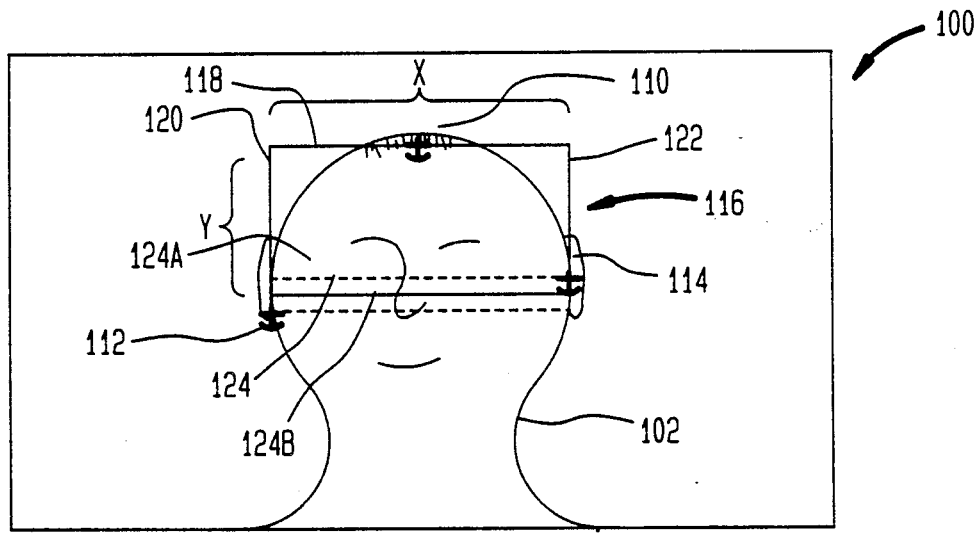

As is shown in FIG. 6, once the three anchors have been placed on the facial image 100, the program in the system 10 calculates a scaling box 116. This box is a rectangle having as its top a horizontal line 118 through the top anchor 110, as its left side a vertical line 120 through the left anchor 112, as its right side a vertical line 122 through the right anchor 114, and as its bottom a horizontal line 124 which has the average height of both the left and right anchors 112 and 114. In FIG. 6 the right anchor 114 is shown having a height indicated by, a line 124A, and the left anchor 112 is shown as having a lower height indicated by the line 124B. The actual bottom line 124 of the scaling box has a height which is the average of these two heights. Once the left, right, top, and bottom boundaries of this scaling box have been determined, a width X of the box, which is the horizontal difference between its left and right boundaries, and a height Y of the box, which is the vertical difference between its top and bottom lines 118 and 124, can be calculated. This value of X and Y are used to scale hair images which are superimposed on the facial image.

Figure 7:
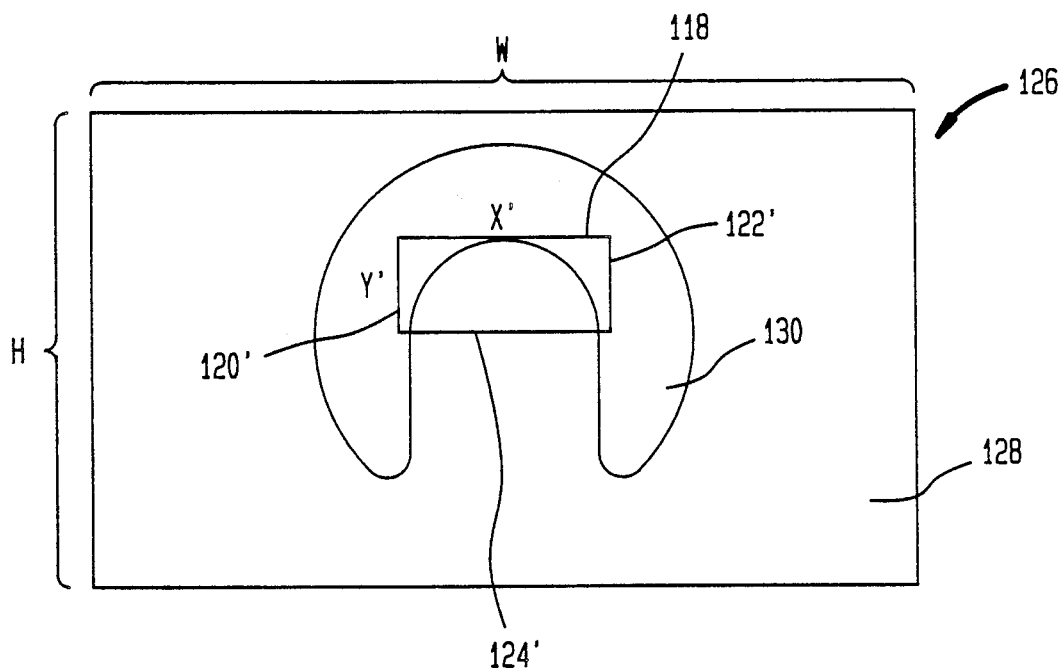

FIG. 7 is a schematic representation of a hair style image 126. This image is made with the same 512×400 video resolution as the facial image 100. It similarly has the same height H and width W in terms of pixels as the image 100. The hair style image 126 contains a background portion 128 which is comprised of nothing but pixels having a value of zero. Pixels with the value of zero represent portions of the image which are transparent, that is, which if added to pixel values in other images would have no effect on those images and which if projected on the monitor screen themselves would correspond to an unilluminated portion of the screen. The hair style image also includes a non-zero area 130 which corresponds to a hair image to be superimposed. The hair image also has a scaling box with a top line 118′, a left line 120′, a right line 122′, and a bottom line 124′, which correspond to the lines 118, 120, 122, and 124 of the scaling box of the facial image 100. As is indicated in FIG. 7, the width of the hair style images scaling box is X′ and its height is Y′. Hair images such as 126 can be made by using the camera 29 and the systems high resolution video board to make an image similar to the image 100 in which the subject is not wearing a hair tube. Then the operator places anchors on the image, and the software then calculates the scaling box and the lines 118′, 120′, 122′, and 124′ for the image. The operator can then use the system's graphic editing tools to cut away all portions of the image other than that corresponding to the subject's hair. This leaves a hair image such as that shown in FIG. 7. These images can be stored on floppy disk and called up from graphical menus.

It should be noted that the sides of the scaling box of the hair style image 126 define anchors, in the senses of placement indicators which are located on the inside of the non-zero portion of the hair style image, the portion which can actually be superimposed on a facial image.

Figure 8:
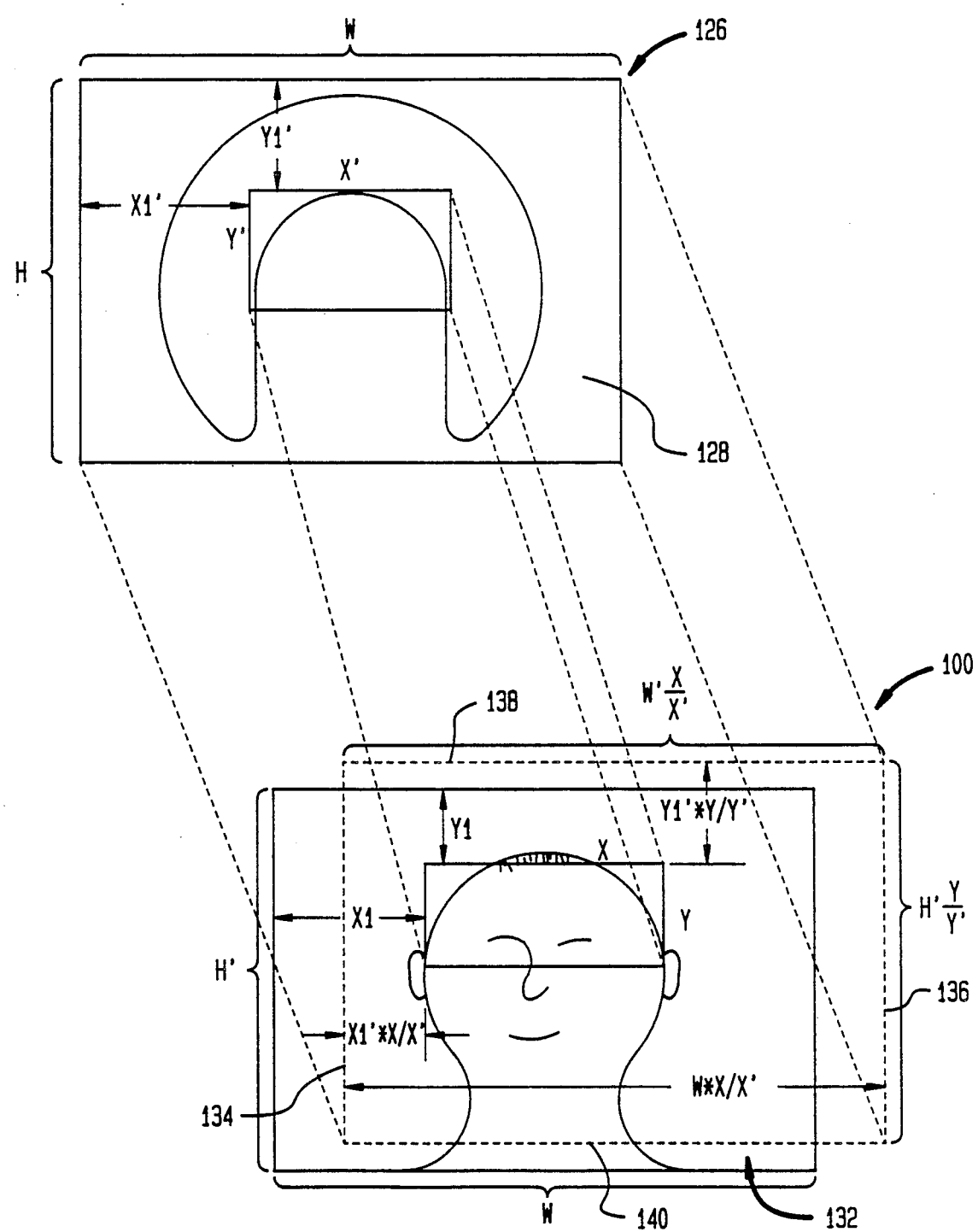

FIG. 8 show how a bounding box 132, shown in dotted lines, is calculated relative to the image 100. The function of the bounding box is to define those pixels of the facial image which, are to be considered as candidates to receive superimposed pixels from the hair style image. This is done by calculating the extent to which the horizontal and vertical dimensions of the hair style image 126 will have to be separately scaled so that its X' by Y' scaling box will be the same size as the X by Y scaling box of the facial image 100. This is done by multiplying the horizontal dimension W of the hair style image by X/X' and its vertical dimension W by Y/Y'. Once this is done a calculation is made of where the boundaries, or bounding box, of such a scaled hair style image would fall relative to the pixels of the facial image 100. The left edge 134 of this bounding box can be calculated as $$LE = X1 - (X1' * X/X')$$

where LE is the horizontal displacement from the left edge of the facial image 100 of the left edge 134 of the bounding box, where X1 is the horizontal displacement, measured from the left edge of the facial image 100, of the left side of that image's scaling box, where X1' is the horizontal displacement, measured from the left edge of the hair style image 126, of the left side of that image's scaling box, and where X/X' is the horizontal scaling factor required to make the scaling box of the hair style image fit the scaling box of the facial image. The right edge 136 of this bounding box can be calculated as $$RE = LE + (W * X/X')$$

where RE is the horizontal displacement, from the left edge of the facial image, of the right edge of the bounding box, and where W is the horizontal Width of both the facial and the hair style images. In FIG. 8, the value of RE is greater than W, meaning that the right edge of the bounding box falls outside of the facial image.

By similar reasoning the top edge of the bounding box can be calculated as $$TE = Y1 - (Y1' * Y/Y')$$

where TE is the vertical displacement, from the top edge of the facial image 100, of the top edge 138 of the bounding box, where Y1 is the vertical displacement, measured from the top edge of the facial image 100, of the top side of that image's scaling box, where Y1' is the vertical displacement, measured from the top edge of the hair style image 126, of the top side of that image's scaling box, and where Y/Y' is the vertical scaling factor required to make the scaling box of the hair style image fit the scaling box of the facial image. The bottom edge 132 of this bounding box can be calculated as $$BE = TE + (H * Y/Y')$$

where BE is the vertical displacement, from the top edge of the facial image, of the bottom edge of the bounding box, and where H is the vertical height of both the facial and the hair style images. In FIG. 8, the value of TE is less than zero, meaning that the top edge of the bounding box falls outside of the facial image.

Figure 9:
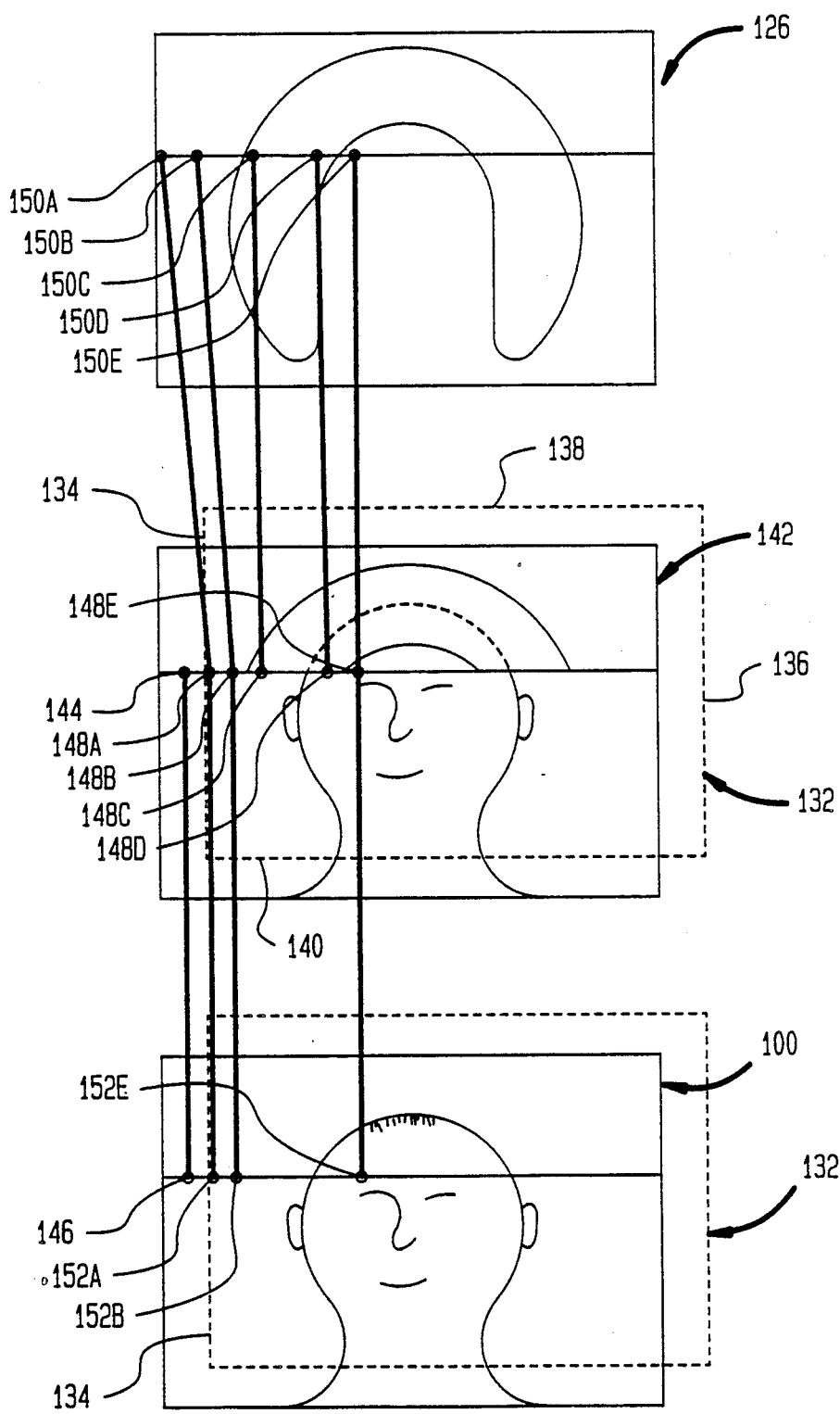

As is indicated in FIG. 9, once the bounding box has been calculated for the image 100, the actual process of superimposing pixels from the hair image 126 on top of the facial image 100 to form a superimposed image 142 begins. In this processes, the Amiga CPU decides for each pixel (x,y) of the superimposed image 142 whether it should take the corresponding pixel (x,y) from the original facial image 100, or whether it should take the corresponding pixel from the hair style image, that with the integer coordinates closest to ((x-LE)*X/X', (y-TE)*Y/Y'). If a pixel of the image 142 corresponds to a pixel 146 of the facial image 100 which is outside the bounding box 132, as does the pixel 144 in FIG. 9, it is given the same value of is corresponding facial image pixel 146.

If a pixel of the image 148 has the coordinates (x,y) of a facial image pixel inside the bounding box, as do pixels 148A-E of FIG. 9, corresponding pixel 150A-E in the scaled and translated hair style image, that is, the pixel of the hair image 126 with the coordinates ((x-LE)*X/X', (y-TE)*Y/Y'). If this hair style image pixel is a zero, or transparent, as in the case with pixels 150A, 150B, and 150E in FIG. 9, the pixel (such as pixel 148A, 148B, and 148E) of the superimposed image 142 will be given the value of the pixel (such as pixel 152A, 152B, and 152E) having the corresponding coordinates (x,y) from the facial image. If the corresponding hair style pixel is non-zero, as is the case with pixels 150C and 150D in FIG. 9, its value is used for the superimposed image, as is indicated in 148C and 148D in the figure.

Figure 10:
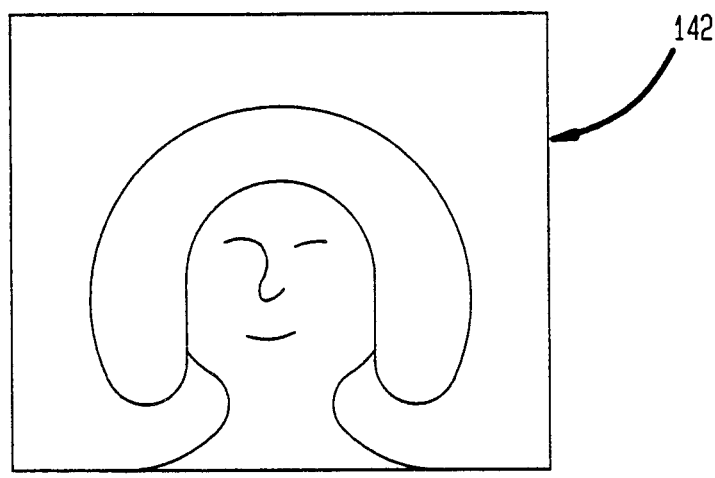

As is shown in FIG. 10, once this process is completed for each pixel of the superimposed image 142 that image will comprise a picture of the facial image 100 with the portion of the hair style 126 corresponding to hair superimposed over it.

Although it is not shown, the present invention enabled users to see hair styles superimposed over a side view of a person's face. This is done by using the video camera to take a picture which is a side view of a person. Then the user places one anchor on what should be the hair line on the center of the forehead of the person pictured, and another on the middle of the person's ear The software then uses the hairline anchor to define the top and one side of the side view facial image's scaling box, and the ear anchor to define the bottom and other side of that box. The system is capable of storing side view hair style images, each of which has a corresponding scaling box defined by the hair line and ear locations. The placement, scaling, expansion and shrinking of these side view hair styles is done in the same manner as are the corresponding functions for the front view hair style described above.

As is indicated above, the user is given the option of selecting from among a plurality of stored hair style images 126 represented by a menu of hair style icons. The user selects a given hair style from the menu by clicking the mouse button when the mouse cursor is on the hair style icon associated with that given hair style. The hair style icons used in this menu are generated automatically from actual hair style images. They are created using the same automatic scaling and placement algorithm described above, except that: 1) instead of being superimposed over a facial image, the hair style is superimposed over a black icon background rectangle;

2) the scaling box used in the icon background rectangle is very small; and 3) the icon's superimposed image of the hair style is represented in gray scale only, with each pixel of the icon being that one of five shades of gray corresponding to the total color intensity of the corresponding portion of hair style. This use of automatically created, scaled, and centered hair style icons greatly facilitates the ease with which new hair style images can be added to the system and the ease with which such hair style images can be accessed by users of the system.

Those skilled in image processing will appreciate that the description of the scaling and placement process above has been greatly simplified. For example, the actual algorithms used to project the superimposed images obey the mathematical formulas listed above, but they use an incremental approach, since this is much faster, and speed is important in graphic processing because of the large amounts of information which must be manipulated to perform such processing.

C. Automatic Smoothing of Superimposed Hair Image

Referring now to FIGS. 11-14, the image enhancement system of the present invention includes an automatic smoothing function. This is desirable because once one superimposes one video image over another, as is shown in FIG. 10, the boundaries of the superimposed image tend to appear very unnatural. This is because at these boundaries unnaturally discrete transitions in color occur from the edge of one pixel to the next, and because the boundaries of such superimposed areas, when they are not absolutely vertical or horizontal give rise to a step-like appearance since pixels are located in an x-y fashion. Most image enhancement systems, including that of the preferred embodiment, provide smoothing tools which let a user average the pixel values in a region around a mouse located smoothing cursor. In the present invention, the software which performs hair superimposition automatically detects the boundary of the superimposed image and calls such a smoothing function all around this boundary.

Figure 11:
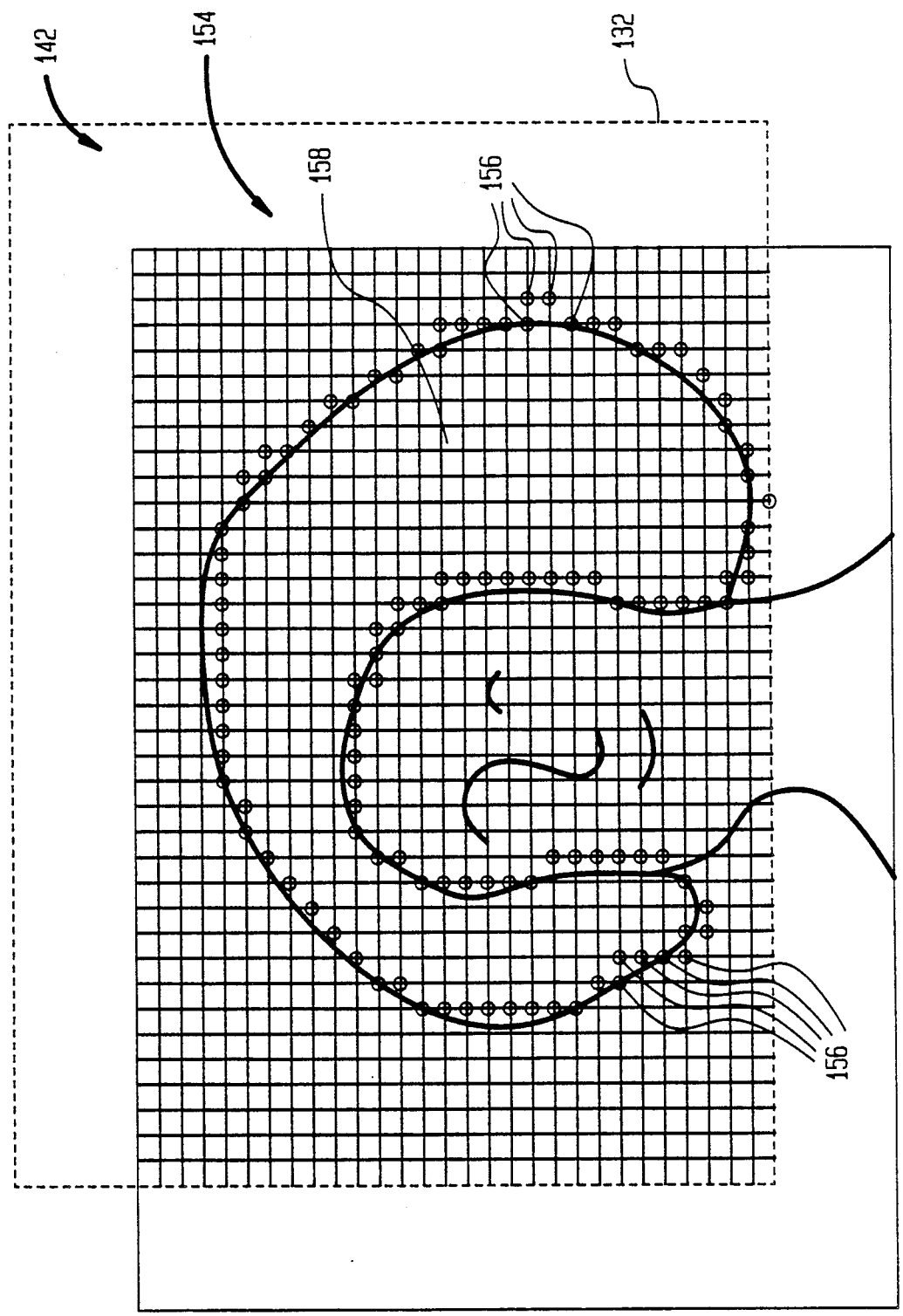
FIG. 11 is an schematic representation of a superimposed image formed by the process of FIGS. 4–10, showing the grid of points at which a test is made to detect the boundary of a superimposed image, and the points which are determined as candidates for smoothing as a result of that test.

As is indicated in FIG. 11, a grid 154 of pixels is associated with that part of the superimposed image 142 which corresponds to pixels within the bounding box 132. This grid includes every fourth pixel along every fourth row of pixels within the bounding box. In the figure each such pixel is represented schematically by the intersection of a horizontal and vertical line. When the superimposition process of FIG. 9 is being performed for each pixel within the bounding box 132 of the superimposed image 142, a check is made to see if the current pixel is one of the pixels in the four-by-four grid. If so, the process checks to see if the grid pixel immediately above the current pixel (that is, the pixel four above) or the grid pixel immediately to the left in the grid of the current pixel (that is, the pixel four to the left) drew its pixel value from a different image than the current pixel. If so, it marks the current pixel as a smoothing point 156. Thus if a given grid pixel of the superimposed image 142 derived its value from facial image 100 and either the grid pixel immediately to the left of or immediately above was drawn from the hair style image 126, the given grid pixel will be marked as a smoothing point 156. Similarly if a given grid pixel derived its value from the hair style image and the grid pixel immediately above it or immediately to the left of it derived its value from the facial image, the given pixel will be marked as a smoothing point. As is indicated in FIG. 11, this causes all grid pixels just to the left of, or just below, the edge of the superimposed hair 158 to be marked as smoothing points.

Figure 12:
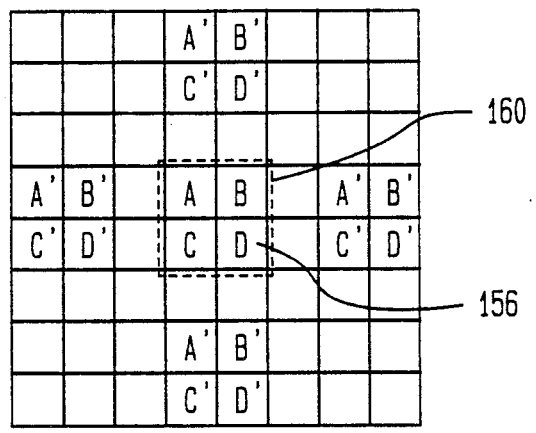
FIGS. 12 and 13 are schematic representations of the two pass smoothing algorithm called for each of the smoothing points shown in FIG. 11.
Figure 13:
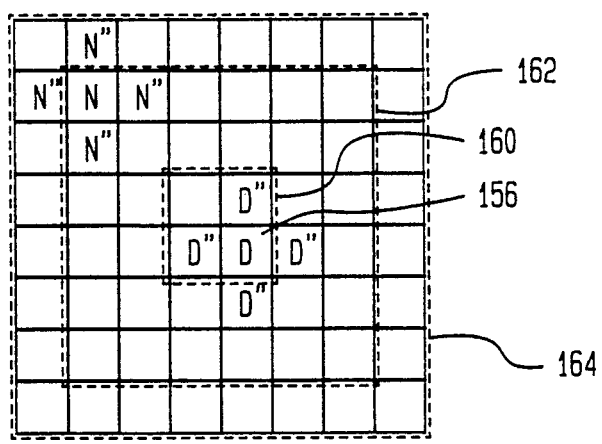

Once smoothing points 156 have been marked around the edge of the superimposed hair 158, a two step smoothing algorithm indicated in FIGS. 12 and 13 is called for each such point. In the first pass of this algorithm, shown in FIG. 12, a set 160 of four pixels, labeled A through D, have their value recalculated. These four pixels are arranged in a two-by-two rectangle, with the lower, right-most of these four pixels, the pixel D, being located on the smoothing point 156 for which the algorithm is called. In the first pass each of the four pixels A-D, has its value replaced with the average of four pixels: the pixel located four pixels above it, the pixel located four pixels below it, the pixel located four pixels to the left of it, and the pixel located four pixels to the right of it. In FIG. 12 each of the pixels averaged to calculate the new value of pixel A are labeled A', each of the pixels averaged to calculate the new value of pixel B are labeled B', and so on.

Once these new values have been calculated for the four pixels A-D of the superimposed image, the second pass of the smoothing algorithm shown in FIG. 13 is performed. In this pass, each of the pixels located in a six-by-six array 162 of pixels has their value recalculated. This six-by-six array is centered around the two-by-two array 160 of pixels whose values were recalculated in the first pass. Thus, the smoothing point 156 is located in the fourth row and fourth column, of the six-by-six array 162 shown in FIG. 13. In this smoothing algorithm, each of the pixels in the six-by-six array has its value replaced with the average of the values of the 4 pixels immediately adjacent to it, that is the pixels above it, below it, to the left of it, and to the right of it. This is illustrated in FIG. 13 via a pixel N which has its values replaced with the average of the values of the 4 pixels labeled N".

It should be noted that the smoothing algorithm of FIG. 13 is performed on the pixels in the six-by-six array in a left to right, top to bottom manner and that pixels to the right of, and below pixels which have previously had their values recalculated use those recalculated values in making the averaging calculation of the second pass. The fact that values recalculated in the second pass are used when calculating new values for pixels immediately to the right and immediately below those recalculated values causes the smoothing algorithm to incorporate more averaged information in the parts of the six-by-six array which are toward its right and its bottom. However, the resulting difference between the amount of information averaged into pixels in the upper left hand corner and the lower right hand corner is sufficiently minor as to be hardly noticeable.

It can be seen that when the two passes of the smoothing algorithm represented in FIGS. 12 and 13 have been completed, the distinction between the color values contained in an eight-by-eight array 164 which is centered approximately around the smoothing point pixel 156 is blurred, creating the optical effect of smoothing the portion of the image contained in that eight-by-eight array.

Figure 14:
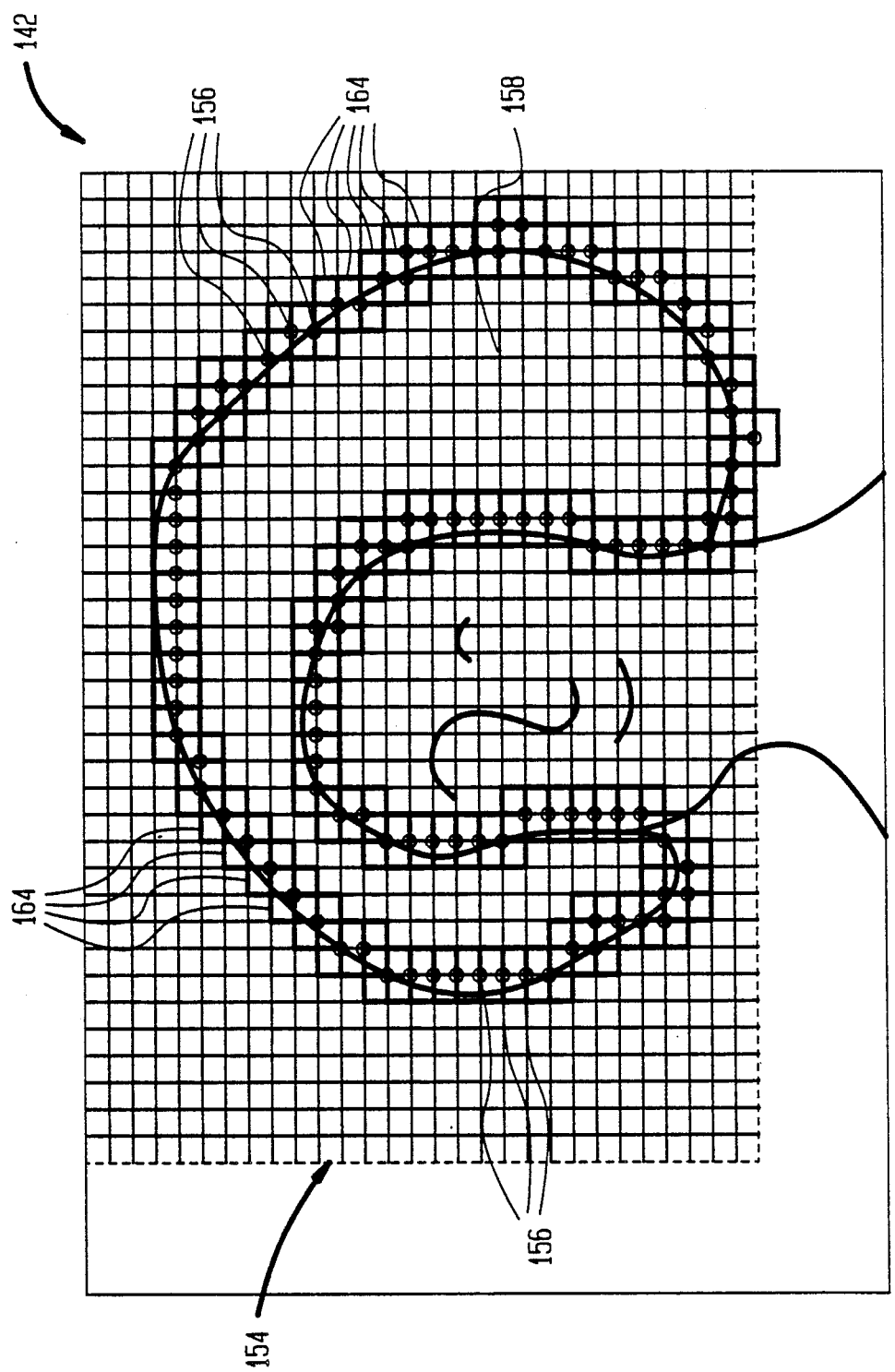
FIG. 14 is a figure similar to FIG. 11 except that it shows how the smoothing functions called for each of the points marked in FIG. 11 overlap.

FIG. 14 is equivalent to FIG. 11 except that it shows an eight-by-eight smoothed array 164 around each of the smoothing points 156 shown in FIG. 11. As can be seen in FIG. 14, the eight-by-eight smoothed arrays of adjacent smoothing points overlap. Since each smoothing point 156 has a horizontal and vertical distance of no more than 4 pixels from each of its nearest smoothing point, and from the nearest portion of the edge of the hair image 158 which gave rise to it, it can be seen that the eight-by-eight smoothed arrays from adjacent smoothing points will overlap each other and virtually all of the actual edge of the hair image 158, insuring that the boundary of that image is well smoothed.

D. Hair Image Shrinking and Expanding

Figure 15:
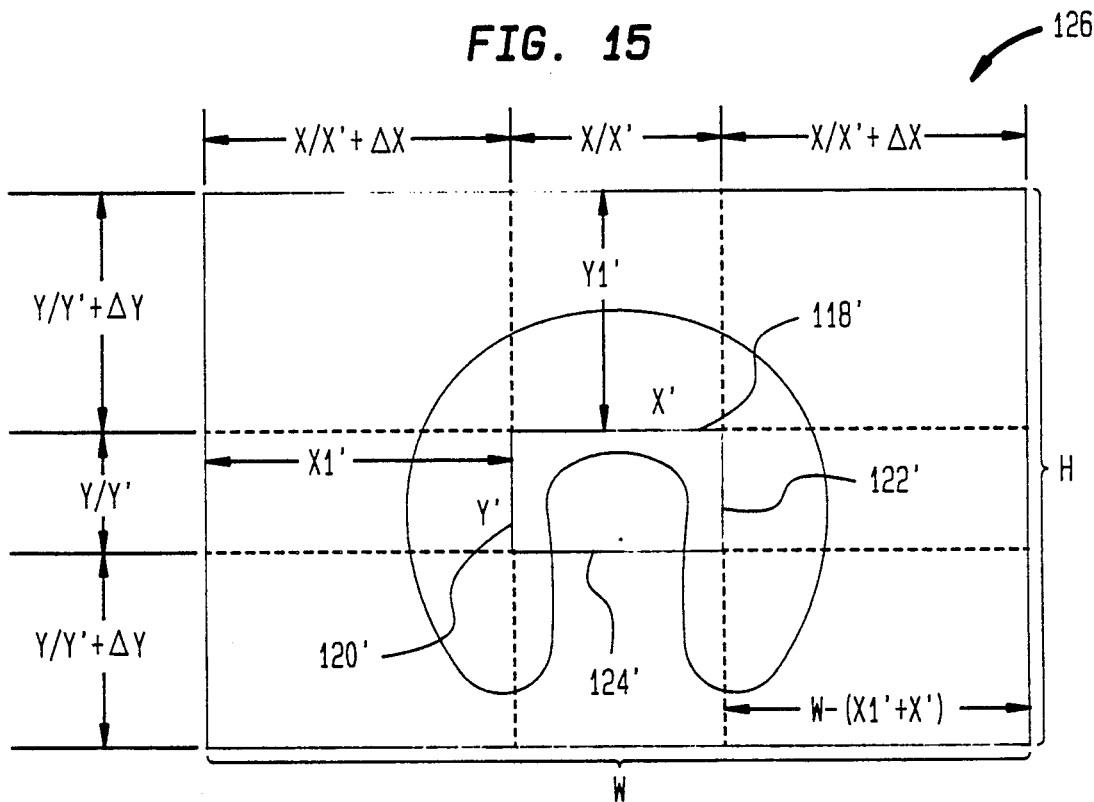
FIGS. 15–21 are schematic representations of facial and hair style images used to demonstrate the process by which a superimposed hair style image is shrunk or expanded.

Referring now to FIGS. 15 to 22, the hair shrinking and expanding feature of the present invention will be explained. FIG. 15 is a representation of a hair style image 126 similar to that shown in FIG. 7, except that in FIG. 15, the hair style image is divided into 9 sectors arranged in three sector columns and three sector rows. The dividing lines between the sector columns and sector rows are formed by extensions of the left and right side lines 120' and 122', and the top and bottom lines 118' and 124', of the scaling box of that hair style image. The hair style image 126 is divided into these nine sectors so that the central sector, which is bounded by its scaling box, can be scaled to fit exactly on top of the scaling box of a facial image, while letting the other sectors of the image be scaled at different ratios so as to either expand or contract the portion of the hair images in those other sectors relative to the scaling box. This is represented in FIG. 15 by the horizontal scaling factor arrows located over each of the image's three sector columns, and by the vertical scaling factor arrows located to the left of each of the image's three sector rows. As can be seen from the figure, the central sector column, that which goes through its central scaling box, is scaled by the factor X/X', where X' and X are the width of the scaling box of the hair style image 126 and the facial image 100, respectively. This is the same scaling factor which is used to perform the automatic hair superimposition described above, since it is a scaling factor necessary to make the scaling box of the hair style image fit the horizontal dimensions of the scaling box of the facial image 100. But as is shown in FIG. 15, the sector columns to the left and right of the central sector column use a scaling factor which is X/X'+DELTA X. The addition of the factor DELTA X to this scaling will cause the horizontal dimension of the portion of the hair style contained in these first and third sector columns to be expanded by an amount DELTA X over the degree of scaling required to make the scaling box of the hair style image fit that of the facial image.

It should be noted that the value of DELTA X can be either negative or positive. If it is positive, the horizontal dimension of part of the hair style corresponding to the first and third sector columns will be expanded. If it is negative, those portions of the hair style will be contracted.

The scaling factors used to perform vertical scaling in each of the three sector rows correspond to the scaling factors used to perform horizontal scaling in each of the three sector columns. The vertical scaling factor used in the central sector row is Y/Y'. This is the scaling factor used in the automatic hair superimposition described above. It is the scaling factor required to make the vertical dimensions of the hair style image's scaling box fit the vertical dimensions of the facial image's scaling box. In the top and bottom sector rows, however, the scaling factor is Y/Y'+DELTA Y, which causes the vertical dimensions in the portions of the hair image in each of these sector rows to be increased by the amount DELTA Y in addition to any scaling which is required to make the hair style's scaling box match the vertical dimensions of the facial image's scaling box.

Figure 16:
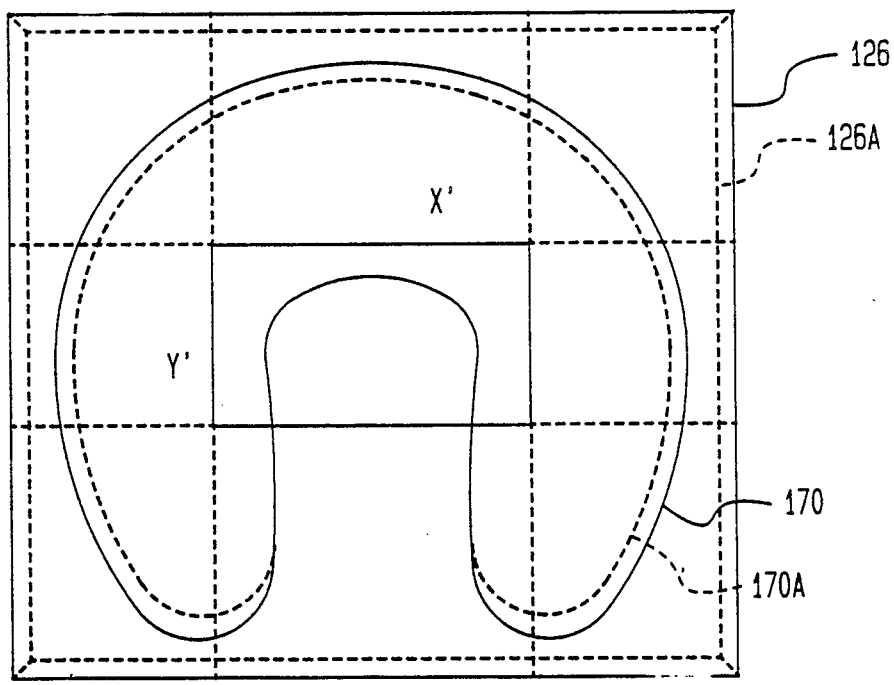

FIG. 16 shows a comparison between a hair style image 126 before shrinking and the same hair style image 126A after it has been shrunk by using the formula shown in FIG. 15 with the value of DELTA X and DELTA Y being negative, so as to make the hair style contract. In the figure, the boundary of the shrunken image 126A and the boundary of the hair within that shrunken image 170A are shown in dotted lines, whereas the corresponding boundaries in the un-shrunken image are labeled 126 and 170, respectively. For purposes of example, it is assumed that the ratio of X/X' and Y/Y' is 1 in this example. It can be seen that the addition of DELTA X and DELTA Y has no effect on the boundary of the hair image within the central sector corresponding to the image's scaling box. In the sectors directly above and below the scaling box the only change is a vertical one, and in the sectors directly to the left and right of the scaling box the only change in the boundaries are vertical ones. But in the four corners sectors, it can be seen that the scaling changes occur in both the vertical and horizontal direction.

The method of actually performing a superimposition of a hair image with either hair shrinking or hair expansion is described with regard to FIGS. 17 thru 20.

Figure 17:
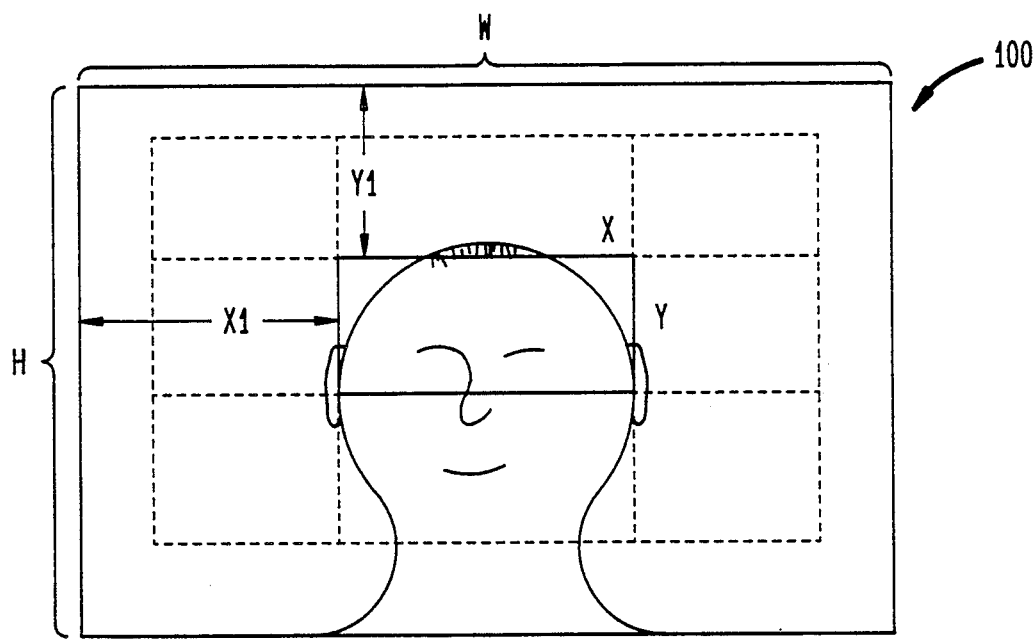

The first task required is that a separate bounding box be calculated for each of the nine sectors of the hair style image which is to be projected upon the facial image shown in FIG. 17. That is, it is necessary to calculate the boundaries of each of those nine sectors when the hair style image 126 is projected onto the facial image 100 with the desired expansion and contraction. Of course, no bounding box calculation has to be made for the projected central sector, since, according to a basic part of the present invention, the central sector of the hair style image will always match exactly the scaling box of the facial image 100.

Figure 18:
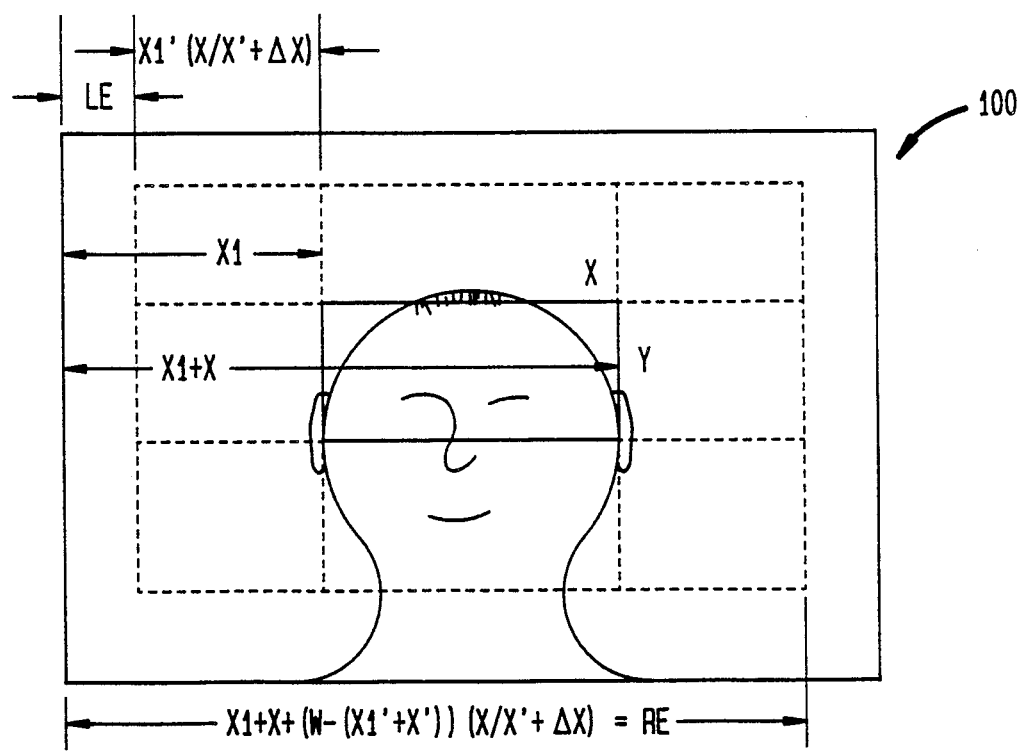

The formulas for the calculation of the vertical lines on the superimposed image which are the boundaries of each of the three projected sector column is shown in FIG. 18. The left hand edge of the central sector column is defined by X1, which is the already known distance from the edge of the image 100 to the left hand edge of its scaling box. The left hand edge of the left most sector column, shown as LE in FIG. 18, is equal to $$X1-X1'(X/X'+DELTA\ X)$$

where X1' is the distance from the left hand edge of the un-condensed hair style image 126 to the left hand edge of its scaling box. The left hand edge of the right most of the sector columns is merely X1+X, that is, it equals the x coordinate of the left hand edge of the facial image's scaling box plus the width of that images scaling box. Finally the right hand edge RE of the right most sector column is defined by the formula $$RE=X1+X+(W-(X1'+X')(X/X'+DELTA\ X)$$

This formula may seem complex but it is actually fairly simple if one takes the time to analyze its components. X1+X, as described above, is the left hand edge of the right most sector column. The term $W-(X1'+X')$ is merely the width of the right most sector column shown in FIG. 15. The term X/X'+DELTA X is merely the expansion or contraction scaling factor which is to be used in the right most sector column.

Figure 19:
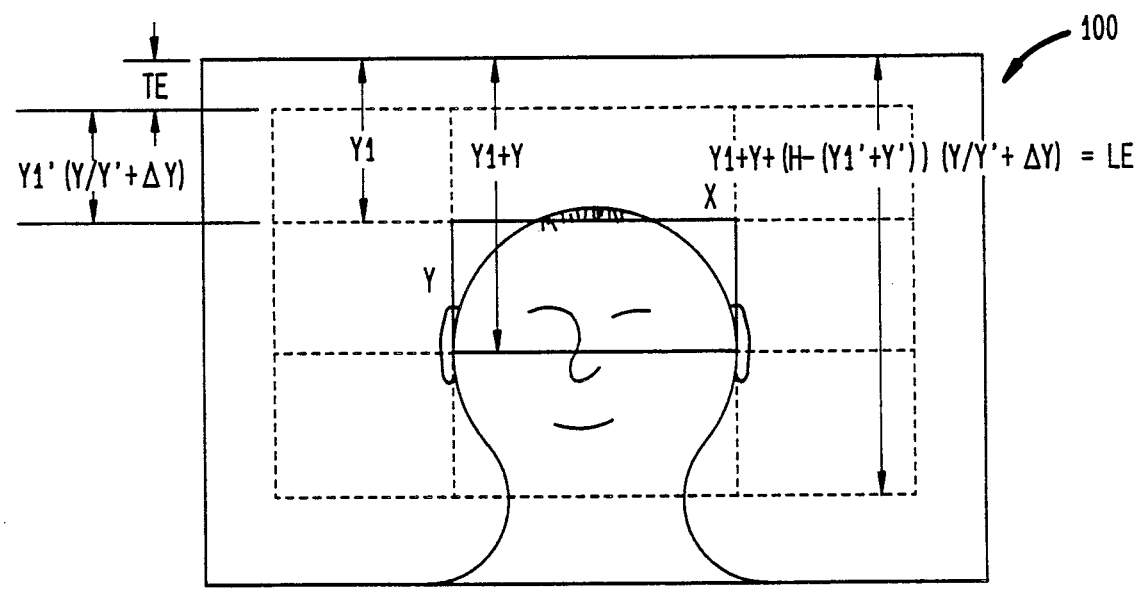

FIG. 19 shows that the vertical displacement from the top of the image 100 to (that is, the y coordinate of) the horizontal boundaries of the projected sector rows are calculated by formulas which correspond exactly to those used to calculate the horizontal displacements, except that 1) Y values are substituted for X values; 2) the height value of images, H, is substituted for the width value of images, W; and 3) that the boundaries are labeled by different numerals. Thus the top boundary of the central sector row has the y coordinate Y1, which is merely the known y coordinate of the top of the facial image's scaling box. The top boundary of the top sector row is defined by Y1−Y1′(Y/Y′+DELTA Y). The topmost boundary of the bottom sector row is defined by the sum of the distances Y1, the displacement to the top of the facial image's scaling box, plus Y, the depth of that scaling box. Finally, the bottom edge BE of the bottom sector row is calculated by the formula $$BE = Y1 + Y + (H - (Y1' + Y'))(Y/Y' + DELTA\ Y).$$

This formula is calculated in the same manner as the corresponding formula for the horizontal displacement RE, described above.

Figure 20:
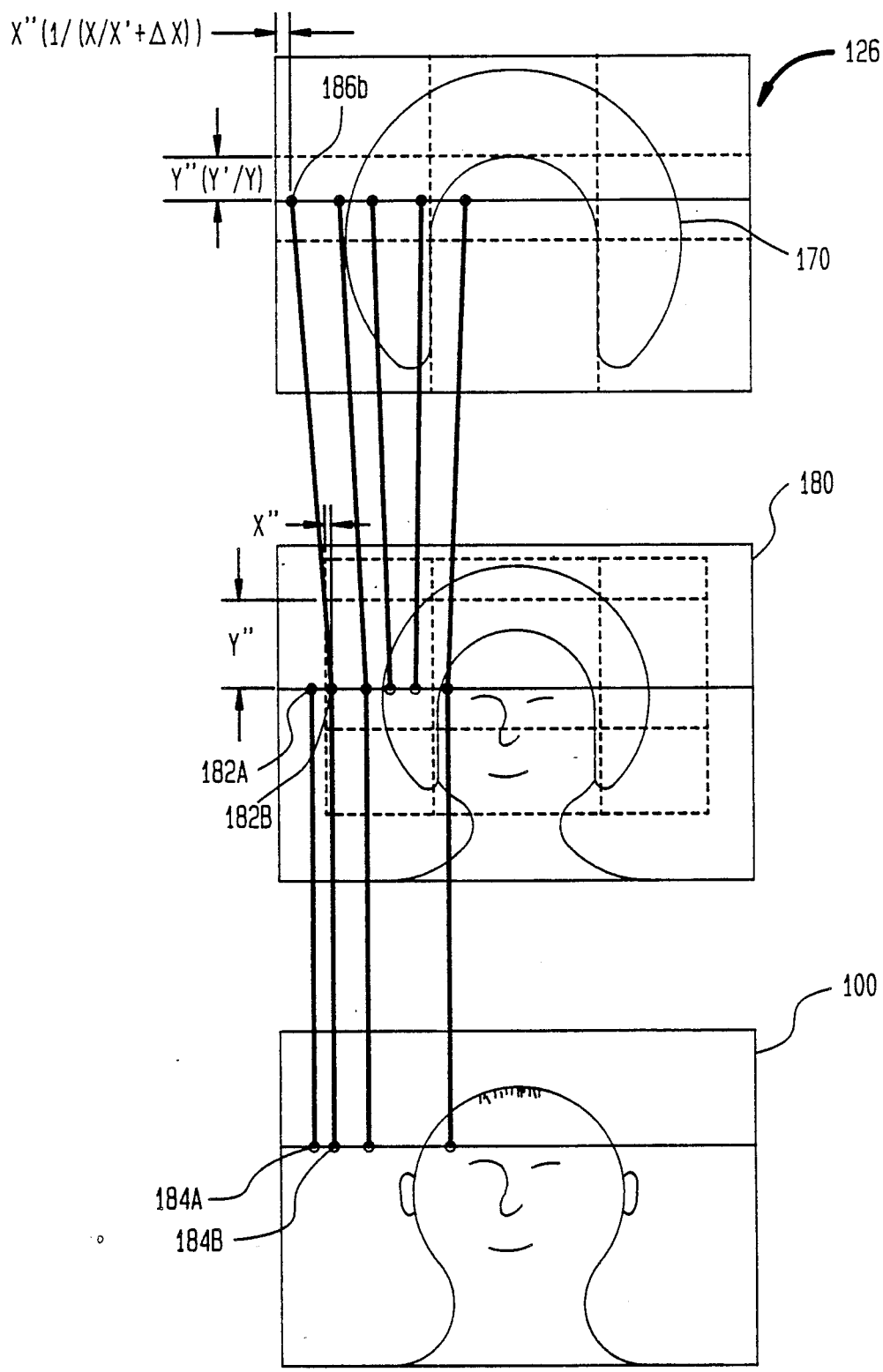

Referring now to FIG. 20, once the bounding boxes have been calculated for the projection of each of the nine sectors of the hair style image 126 onto the facial image 100, the hair expansion or contraction process next performs the step of actually superimposing the contracted or expanded hair image on top of the facial image to create a new superimposed image 180. For each pixel of the superimposed image 180 the process makes a determination whether it should derive the values for that pixel from a corresponding pixel in the facial image 100 or in the hair style image 126. If the pixel under consideration in the superimposed image lies outside of any of the bounding boxes for the nine sectors of the projected hair style image, the pixel value is merely copied from the pixel having the same coordinates in the facial image 100. This is demonstrated in FIG. 20 by the pixel 182A of the superimposed image 180, which derives its value from its corresponding pixel 184A in the facial image 100. If, however, a pixel of the superimposed image is located inside one of the bounding boxes calculated in FIGS. 17-19, the process must determine which pixel in the hair style image 126 corresponds to that pixel and whether or not that corresponding pixel is a 0, or transparent, pixel or is a pixel associated with an actual hair style picture. If this corresponding pixel is a 0, then the process will take the value of the corresponding pixel in the facial image 100 as the value for the pixel of the superimposed image. If, on the other hand, the value of the corresponding pixel in the hair style image 126 is nonzero, that nonzero value is picked as the value for the pixel in the superimposed image.

The method for calculating which pixel in the image 126 corresponds to a given pixel within one of the nine sector bounding boxes is relatively straightforward. For purposes of example, consider the pixel 182B of the superimposed image 180 whose value is to be determined. The Y coefficient of this pixel's corresponding pixel 186B in the hair style image is calculated by taking the Y coefficient or the vertical downward displacement of that pixel 182B relative to the top of its image 180. By comparing this vertical displacements with the known displacements of the boundaries associated with each of the sector rows calculated as shown in FIG. 19 a quick determination can be made of which sector row the pixel 182B corresponds to. Then the excess of the pixel of the vertical displacement of the pixel 182B over the vertical displacement of the upper boundary of its sector row is calculated. This difference is represented by the value Y″ shown in FIG. 20. Then this value Y″ is multiplied by the inverse of the scaling factor for that corresponding sector row shown in FIG. 15. In the case of the example shown with regard to pixel 182B, this pixel is located in the central sector row and thus the inverse of the vertical scaling factor used in that row is Y/Y′ thus the pixel 186B of the hair style image which corresponds to the pixel 182B will be placed down of the upper boundary from the central sector row of the hair style image 126 by a value equal to Y″ (Y′/Y). Once this calculation has been made for the first pixel in a row of pixels it need not be made again for any other pixels in that row since all pixels in a given row will have the same corresponding vertical displacement relative to the image 126.

The horizontal displacement is calculated in an analogous manner. That is, the horizontal displacement of the pixel 182B to be determined in the superimposed image 180 is compared to the horizontal displacement of the boundaries of the three sector columns of the hair style image to be projected onto the superimposed image. From this comparison, a determination is made of which of the three sector columns the pixel 182B is located in and its rightward, horizontal displacement into that column is determined as is represented by the label X″ in FIG. 20. Once the value of X″ has been calculated the X coordinate of the corresponding pixel 86B within the hair style image 126 is calculated by the formula X″ (1/(X/X′+DELTA X)). As can be seen from FIG. 15, this formula merely multiplies the offset X″ of the point 182B within its sector bounding box by the inverse of the scaling factor X/X′+DELTA X associated with the first sector column in which the pixel 182B is located. After both the X and Y coordinates of the corresponding point 186B contained within the hair style image 126 has been calculated, the program addresses the pixel 186B actually having the closest integer X, Y coordinates and determines whether that value is a zero, or transparent, value or is a value associated with the hair style image which is to be superimposed on the facial image. In the example of FIG. 20, the pixel 186B lies outside the actual hair image 170 and thus is a transparent pixel. As a result, the value of the pixel 184B in the facial image 100 having the same X,Y coordinates as the pixel 182B whose value is to be determined, is used as the value of the pixel 182B.

Figure 21:
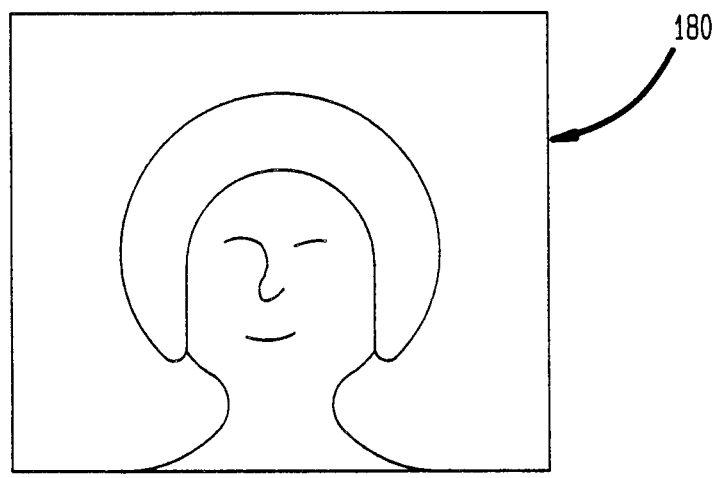

It can be seen that after this process is repeated for all of the pixels of the superimposed image 180 an image of the hair style 170 which has been shrunk to have the proportions of the image 170A shown in FIG. 16 will be placed on top of the facial image 100 to create a superimposed image 180 as is shown in FIG. 21.

What is claimed is:

1. An image enhancement system including:
    means for storing a representation of a first image;
    means for creating a superimposed image by superimposing a second image over portions of the representation of the first image;
    means for automatically marking a plurality of locations along the boundary in the superimposed image between portions containing part of the first image and portions containing part of the second image;

means for performing a graphic smoothing function, including means for changing the light value associated with a given picture element to be more equivalent to the light value of picture elements in its vicinity; and means for automatically causing said means for performing a graphic smoothing function to perform said function in the vaccination of each of said marked locations, so as to automatically smooth the boundary between the first and second images in said superimposed image.

2. An image enhancement system as in claim 1 wherein:
said images are composed of an array of picture elements each having a light value;
said marked locations along the boundary in the superimposed image correspond to picture elements; and
when said smoothing function is called in the vicinity of one of said marked locations, it calculates a new light value for a given picture element in the vicinity of said marked location as a function of light values from picture elements which are separated from said given picture element by more than one picture element.

3. An image enhancement system as in claim 2, wherein said means for performing a graphic smoothing function includes a first means for calculating the light value for each of a plurality of picture elements adjacent said given picture element as a function of the light values of picture elements which are separated from each of said plurality of picture elements by more than one picture element, and second means for calculating the new light value for said given picture element as a function of the light value calculated by the first means for each of said plurality of picture elements.

4. An image enhancement system as in claim 1, wherein:
said means for storing a representation of said first image includes means for storing a representation of a person's head; and
said means for creating a superimposed image over portions of said first image includes means for creating a superimposed image of a hair style.

5. An image enhancement system including:
means for storing a representation of a first image containing a representation of a human head;
means for storing a hair style image;
means for defining certain locations on said hair style image;
means for defining certain locations on said representation of a human head;
means for superimposing and scaling said hair style image on said image of a human head so that said defined locations on said hair style image fit on said defined locations on said representation of a human head; and
means for altering the size of said hair style in horizontal and vertical directions without altering the fit of said defined locations on said hair style image to said defined locations on said representation of a human head.

6. An image enhancement system as in claim 5, wherein:
said first image includes a frontal representation of a human head;
said hair style image is a frontal image of hair style;
said means for defining certain locations on said representation of a human head include means for marking the location of both ears and the hair line in the center of the forehead on said head; and
said means for defining certain locations on said hair style image include means for marking where both ears and the hair line in the center of the forehead belong on said hair image.

7. An image enhancement system as in claim 5, wherein:
said first image includes a side representation of a human head;
said hair style image is a side image of a hair style;
said means for defining certain locations on said representation of a human head include means for marking the ear and the hair line in the center of the forehead on said head; and
said means for defining certain locations on said hair style image include means for marking where an ear and the hair line in the center of the forehead belong on said hair image.

8. An image enhancement system as in claim 5, wherein said means for altering the size of said hair style in horizontal and vertical directions includes means for altering the relative size of said hair style independently in said horizontal and vertical directions.

9. An image enhancement system including:
means for storing a representation of a first image containing a frontal view of a human head;
means for storing a frontal image of a hair style;
means for defining locations corresponding to both ears and the hair line in the center of the forehead on said hair style image;
means for defining locations corresponding to both said ears and the hair line in the center of the forehead on said frontal view of a human head; and
means for superimposing said hair style image on said image of a human head, including means for translating and scaling the hair style image so that said defined locations on said hair style image fit on said defined locations on said representation of a human head.

10. An image enhancement system including:
means for storing a representation of a first image containing a side view of a human head;
means for storing a corresponding side image of a hair style;
means for defining locations corresponding to one ear and the hair line in the center of the forehead on said hair style image;
means for defining locations corresponding to one ear and the hair line in the center of the forehead on said side view of a human head; and
means for superimposing said hair style image on said image of a human head, including means for translating and scaling the hair style image so that said defined locations on said hair style image fit on said defined locations on said representation of a human head.

11. A method for enhancing an image including the steps of:
storing a representation of a first image;
creating a superimposed image by superimposing a second image over portions of the representation of the first image;
automatically marking a plurality of locations along the boundary in the superimposed image between portions containing part of the first image and portions containing part of the second image;

performing a graphic smoothing function which changes the light value associated with a given picture element to be more equivalent to the light value of picture elements in its vicinity; and automatically performing said graphic smoothing function in the vicinity of each of said marked locations, so as to automatically smooth the boundary between the first and second images in said superimposed image.

12. A method for enhancing an image as in claim 11, wherein:

said images are composed of an array of picture elements each having a light value;

said marked locations along the boundary in the superimposed image correspond to picture elements; and when said smoothing function is called in the vicinity of one of said marked locations, it calculates a new light value for a given picture element in the vicinity of said marked location as a function of light values from picture elements which are separated from said given picture element by more than one picture element.

13. A method for enhancing an image as in claim 12, wherein said smoothing function calculates a new light value for given picture element in a process having at least two smoothing steps, the first step calculating the light value for each of a plurality of picture elements adjacent said given picture element as a function of the light values of picture elements which are separated from each of said plurality of picture elements by more than one picture element, and the second step calculating the new light value for said given picture element as a function of the light value of each of said plurality of picture elements.

14. A method for enhancing an image in claim 12, wherein:

said storing of a representation of said first image includes storing a representation of a person's head; and said creating of a superimposed image over portions of said first image includes creating a superimposed image of a hair style.

15. A method for enhancing an image including:

storing a representation of a first image containing a representation of a human head;

storing a hair style image;

defining certain locations on said hair style image;

defining certain locations on said representation of a human head;

superimposing and scaling said hair style image on said image of a human head so that said defined locations on said hair style image fit on said defined locations on said representation of a human head; and altering the size of said hair style in horizontal and vertical directions without altering the fit of said defined locations on said hair style image to said defined locations on said representation of a human head.

16. A method for enhancing an image as in claim 15, wherein:

said first image includes a frontal representation of a human head;

said hair style image is a frontal image of a hair style;

said defining of certain locations on said representation of a human head includes marking the location of both ears and the hair line in the center of the forehead on said head; and said defining of certain locations on said hair style image includes marking where both ears and the hair line in the center of the forehead belong on said hair image.

17. A method for enhancing an image as in claim 15, wherein:

said first image includes a side representation of a human head;

said hair style image is a side image of a hair style;

said defining of certain locations on said representation of a human head includes marking the one ear and the hair line in the center of the forehead on said head; and said defining of certain locations on said hair style image includes marking where one ear and the hair line in the center of the forehead belong on said hair image.

18. A method for enhancing an image as in claim 15, wherein said altering of the size of said hair style in horizontal and vertical directions includes altering the relative size of said hair style independently in said horizontal and vertical directions.

19. A method for enhancing an image including:

storing a representation of a first image containing a frontal view of a human head;

storing a frontal image of a hair style;

defining locations corresponding to both ears and the hair line in the center of the forehead on said hair style image;

defining locations corresponding to both said ears and the hair line in the center of the forehead on said frontal view of a human head; and superimposing said hair style image on said image of a human head, including translating and scaling the hair style image so that said defined locations on said hair style image fit on said defined locations on said representation of a human head.

20. A method for enhancing an image including:

storing a representation of a first image containing a side view of a human head;

storing a corresponding side image of a hair style;

defining locations corresponding to one ear and the hair line in the center of the forehead on said hair style image;

defining locations corresponding to one ear and the hair line in the center of the forehead on said side view of a human head; and superimposing said hair style image on said image of a human head, including translating and scaling the hair style image so that said defined locations on said hair style image fit on said defined locations on said representation of a human head.

* * * * *